United States Patent
Ting et al.

(10) Patent No.: US 10,333,980 B2
(45) Date of Patent: Jun. 25, 2019

(54) PERSONAL DEVICE NETWORK FOR USER IDENTIFICATION AND AUTHENTICATION

(71) Applicants: David M. T. Ting, Sudbury, MA (US); Alain Slak, Bedford, MA (US); Kyle Vernest, Boston, MA (US)

(72) Inventors: David M. T. Ting, Sudbury, MA (US); Alain Slak, Bedford, MA (US); Kyle Vernest, Boston, MA (US)

(73) Assignee: IMPRIVATA, INC., Lexington, MA (US)

(*) Notice: Subject to any disclaimer, the term of this patent is extended or adjusted under 35 U.S.C. 154(b) by 39 days.

(21) Appl. No.: 14/945,609

(22) Filed: Nov. 19, 2015

(65) Prior Publication Data

US 2016/0142443 A1    May 19, 2016

Related U.S. Application Data

(60) Provisional application No. 62/081,820, filed on Nov. 19, 2014.

(51) Int. Cl.
| | |
|---|---|
| *H04L 29/06* | (2006.01) |
| *H04W 4/02* | (2018.01) |
| *H04W 12/06* | (2009.01) |
| *H04W 12/08* | (2009.01) |

(52) U.S. Cl.
CPC .............. *H04L 63/20* (2013.01); *H04L 63/08* (2013.01); *H04L 63/10* (2013.01); *H04W 4/02* (2013.01); *H04W 12/06* (2013.01); *H04W 12/08* (2013.01)

(58) Field of Classification Search
CPC .......... H04L 63/20; H04L 63/08; H04L 63/10; H04W 4/02; H04W 12/06; H04W 12/08
See application file for complete search history.

(56) References Cited

U.S. PATENT DOCUMENTS

| | | | |
|---|---|---|---|
| 8,646,060 B1* | 2/2014 | Ben Ayed | H04L 63/0853 726/9 |
| 2007/0136792 A1* | 6/2007 | Ting | G06F 21/32 726/5 |
| 2010/0022239 A1* | 1/2010 | Anzai | B60R 25/24 455/434 |
| 2010/0059587 A1* | 3/2010 | Miller | G06Q 20/1085 235/379 |
| 2011/0221566 A1* | 9/2011 | Kozlay | G06F 21/35 340/5.53 |
| 2013/0145420 A1* | 6/2013 | Ting | H04L 63/08 726/1 |

(Continued)

*Primary Examiner* — Mohammad A Siddiqi
(74) *Attorney, Agent, or Firm* — Morgan, Lewis & Bockius LLP

(57) ABSTRACT

Established user habits in carrying multiple wirelessly detectable devices are used to provide or substantiate authentication. In some embodiments, simply detecting that expected devices are co-located within a limited spatial region is sufficient to establish that the devices are being carried by a single individual. In other embodiments, particularly where the potential for spoofing by multiple individuals is a concern, single-user possession of the devices may be confirmed by various corroborative techniques. This approach affords convenience to users, who may be working at a device that lacks the necessary modality (e.g., a fingerprint or vein reader) for strong authentication.

34 Claims, 2 Drawing Sheets

(56) References Cited

U.S. PATENT DOCUMENTS

| | | | |
|---|---|---|---|
| 2014/0091903 A1* | 4/2014 | Birkel | B60R 25/24 340/5.54 |
| 2014/0282967 A1* | 9/2014 | Maguire | H04W 36/18 726/7 |
| 2014/0359750 A1* | 12/2014 | Adams | G06F 21/74 726/16 |
| 2015/0082406 A1* | 3/2015 | Park | H04L 63/0853 726/9 |
| 2015/0128240 A1* | 5/2015 | Richards | H04L 63/0861 726/7 |
| 2015/0189378 A1* | 7/2015 | Soundararajan | H04N 21/44218 725/12 |
| 2015/0281227 A1* | 10/2015 | Fox Ivey | H04L 63/0853 713/168 |
| 2015/0286813 A1* | 10/2015 | Jakobsson | G06F 21/35 726/9 |
| 2016/0004852 A1* | 1/2016 | McEvoy | H04L 51/28 726/7 |
| 2017/0032114 A1* | 2/2017 | Turgeman | G06F 21/32 |

* cited by examiner

PERSONAL DEVICE NETWORK FOR USER IDENTIFICATION AND AUTHENTICATION

RELATED APPLICATION

This application claims the benefit of and priority to U.S. Provisional Patent Application No. 62/081,820, filed Nov. 19, 2014, the entire disclosure of which is hereby incorporated by reference.

TECHNICAL FIELD

Embodiments of the present invention relate generally to authentication and, more specifically, to authenticating a user seeking remote access to secure data and/or applications.

BACKGROUND

Remote or externally hosted applications, such as web-based applications, may be deployed and executed on local client devices via the use of web browsers or other local client software. Frequently, a user of the client device is required to authenticate himself before using the remote application in accordance with the security policy of the organization, company, or network of which the user is a member, the security policy of the remote application provider, or other security policy. This authentication may include supplying a username and password, interacting with a biometric scanner or a fingerprint reader, and/or authentication in some other manner. Authentication is particularly stringent for applications involving the exchange or retrieval of sensitive or confidential information.

In conventional systems, the remote application typically collects authentication information. In the case of a username/password process, the remote application may, for example, present a dialog box prompting the user for this information and verify the received username and password against a secure list. In the case of device-based authentication (e.g., a fingerprint reader), the remote application includes software to interact with and operate the device (to, e.g., activate it, receive the scanned user fingerprint data, and either verify the received fingerprint data against known fingerprint data or transmit it to an authentication server). Often, for security reasons, the software used to interact with the hardware device is a browser plug-in.

Although, as noted, security policies may vary greatly depending on the nature of the application and the policies of an organization, authentication generally entails some effort on the part of the would-be user—supplying the password, operating one-time token-generating device to obtain an authentication code, providing a fingerprint, etc.—as well as provision of the supporting hardware (which, in the case of token-generating devices, must be provided on an individual basis to each user, who must be in possession of the device when logging in). A need therefore exists for techniques for managing authentication that reduce or eliminate the need for specialized hardware and/or cumbersome sign-in procedures.

SUMMARY

Embodiments of the present invention utilize established user habits in carrying multiple wirelessly detectable devices as a means of providing or substantiating authentication. For example, an individual may typically carry a mobile phone and a tablet, and also wear a "smart" watch (running applications, or "apps," with wireless connectivity to one or both of the other devices). Wirelessly determining that an individual seeking authentication possesses all three devices may, depending on an organization's security policy, be sufficient to authenticate the individual for access to certain secure applications or contribute to satisfaction of an authentication policy. In some embodiments, simply detecting that the devices are co-located within a limited spatial region is sufficient to establish that the devices are being carried by a single individual. In other embodiments, particularly where the potential for spoofing by multiple individuals is a concern, single-user possession of the devices may be confirmed by various corroborative techniques. This approach affords convenience to users, who may be working at a device that lacks the necessary modality (e.g., a fingerprint or vein reader) for strong authentication.

Accordingly, in a first aspect, the invention relates to a system for authenticating a user of a client device seeking access to a secure resource. In various embodiments, the system comprises (a) an authentication server comprising (i) an identity database including entries relating users with wireless devices belonging to the users, a memory for storing a security policy governing access to the secure resource, and (iii) circuitry for communicating with client devices and with the secure resource, and (b) a client device comprising (i) a processor, communication circuitry, and (iii) a memory containing stored instructions for causing the processor to (iii) (A) detect the presence of proximately located devices using the communication circuitry and (iii) (B) to communicate with the server. The server and the client device cooperate to determine whether other wireless devices detected by the client communication circuitry are co-located and, if so, whether the device co-location satisfies the security policy, and if so, according user access to the secure resource.

The client device may be configured to detect other devices and intercommunicate therewith over a device network. For example, a client device may be configured to obtain proximity data from the other devices, where the co-location determination is based at least in part on the proximity data. The proximity data may include or consist of detected signal strengths from the other devices and/or may include or consist of data tracking device movement. If the security policy is not satisfied, the server and client device may cooperate to (a) identify at least one additional authentication step whose fulfillment would satisfy the security policy and (b) cause fulfillment of the at least one additional authentication step.

In various embodiments, the server and client are configured to search initially for additional authentication steps whose fulfillment would satisfy the security policy and that do not require user action. If there are no additional authentication steps that do not require user action but would satisfy the security policy (i.e., if all additional authentication steps would require user action), the client may engage the user to fulfill the at least one additional authentication step.

The authentication server and the client device may be configured to cooperatively update a user's entry in the identity database by (i) at the client device, scanning for proximate wireless devices and transmitting registration information therefor to the authentication server, and (ii) at the authentication server, updating the user's entry in the identity database by adding registration information for devices not already listed in the user's entry. The authentication server may be further configured to remove a device entry from a user's database record if the device has not been detected during more than a threshold number of log-in events at the client device.

In another aspect, the invention pertains to a method for authenticating a user of a client device seeking access to a secure resource. In various embodiments, the method comprises the following steps at a client wireless device: downloading a security policy; electronically detecting other wireless devices co-located with the client wireless device; determining whether detection of the other devices co-located with the client device satisfies the downloaded security policy; and if so, according the user access to the secure resource. For example, the client device may communicate with the other devices over a device network.

In some embodiments, the method further comprises the step of obtaining, by the client device, proximity data from the other devices, where the co-location determination is based at least in part on the proximity data. The proximity data may include or consist of detected signal strengths from the other devices and/or may include or consist of data tracking device movement. If the security policy is not satisfied, at least one additional authentication step whose fulfillment would satisfy the security policy may be identified and fulfilled.

In various embodiments, the method further comprises the step of searching initially for additional authentication steps whose fulfillment would satisfy the security policy and that do not require user action. If there are no such additional authentication steps, the user is engaged to fulfill the at least one additional authentication step. The devices may, in some embodiments, form an ad hoc network.

Another aspect of the invention relates to a method for authenticating a user of a client device seeking access to a secure resource. In various embodiments, the method comprises the steps of, at a server, electronically accessing a security policy; receiving data from the client device indicative of detection of other wireless devices; determining, based on the data, whether the detected devices are co-located with the client wireless device; determining whether co-location of the other devices with the client device satisfies the downloaded security policy; and if so, according the user access to the secure resource.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, routines, steps, or characteristics may be combined in any suitable manner in one or more examples of the technology. As used herein, the terms "approximately" and "substantially" mean±10%, and in some embodiments, ±5%.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
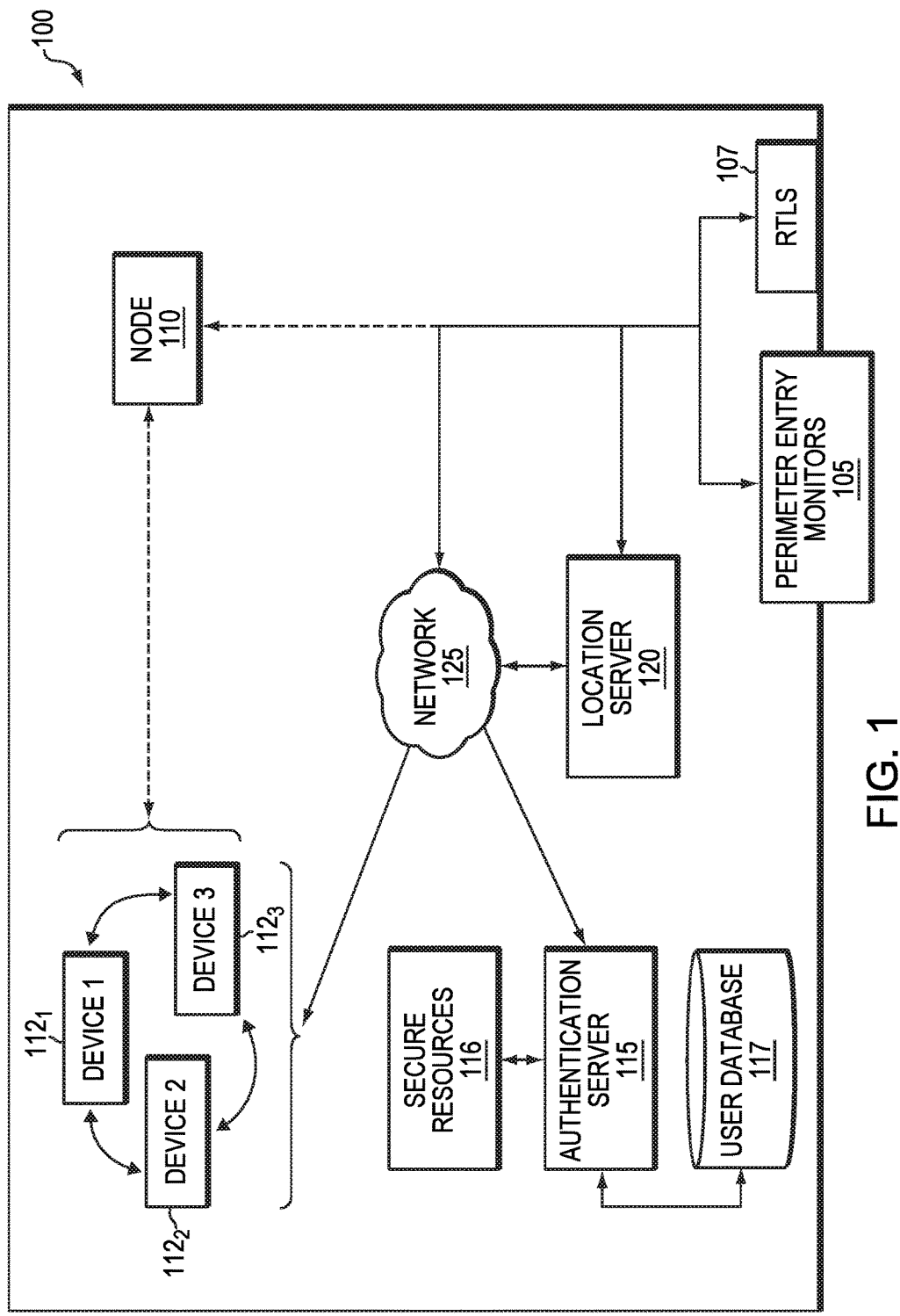
FIG. 1 schematically illustrates an institutional space including devices and servers in accordance with embodiments of the invention.

Refer first to FIG. 1, which illustrates a generalized environment in which embodiments of the invention may be deployed. The environment is an institutional space 100, such as a hospital, which may include multiple buildings each including perimeter-entry monitors 105. These may, for example, be card readers that detect and log user entry into the institution and/or restrict entry to secure areas to authorized personnel. A real-time location service (RTLS) system 107 monitors the changing locations of users with the space 100 (e.g., via wireless detection of tags worn by users and/or affixed to devices they carry). A typically large number of nodes 110, which may be movable within the space 100, are available for users as they discharge their responsibilities. These nodes 110 may include workstations, thick or thin client devices, kiosks, beacons and network-connected medical devices. In general, a node is able to access, via a network, one or more data stores that include information (e.g., EMR) of interest to users (e.g., clinicians), and which require authentication before access will be granted. While working at a node, a user may have one or more mobile wireless devices 112 with her. Mobile devices 112 may be "smart phones," tablets and/or watches with advanced computing ability that, generally, support bi-directional communication and data transfer using long- and short-range wireless protocols, and are capable of executing locally stored applications. Mobile devices include, for example, IPHONES and IWATCHES (available from Apple Inc., Cupertino, Calif.), BLACKBERRY devices (available from Research in Motion, Waterloo, Ontario, Canada), or any smart phones equipped with the ANDROID platform (available from Google Inc., Mountain View, Calif.), tablets, such as the IPAD and KINDLE FIRE, personal digital assistants (PDAs), fitness-tracking devices, purpose-built authentication devices capable of wireless communications, wireless headphones, microphones, glasses or biometric devices.

User log-on via a node 110 may be handled by a separate (and conventional) authentication server 115, which manages access to secure resources 116 and authenticates users based on their credentials in accordance with a stored institutional security policy. That policy may require different tiers of authentication depending on the resource 116 to which the user seeks access; for example, a simple password log-in may be sufficient for access to routine applications or data, while stronger authentication or some form of corroboration may be required for access to secure data. A user database 117 includes information about authorized users, including, in particular, records specifying, for each user, devices that the user frequently carries together. (As discussed below, user log-on and interaction with remotely hosted data and applications may occur via one of the devices 112, i.e., a user's device 112 can function as a node 110).

Optionally, a location server 120 stores user locations as determined by perimeter-entry monitors 105 and RTLS 107.

RTLS reference points, which can be either transmitters or receivers, are spaced throughout a facility to detect the presence of identified tags. In many implementations, registering user entry and updating detected user locations are functions performed by the facility's security system.

The devices 110, 112 and servers 115, 120 communicate over a network 125. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter. When used in a WAN networking environment, computers typically include a modem or other communication mechanism and phones may operate over the public telecommunications infrastructure. Modems may be internal or external, and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), Bluetooth, Zigbee, IrDa, near-field communication (NFC), or other suitable protocol. Furthermore, components of the system may communicate through a combination of wired or wireless paths, and communication may involve both computer and telecommunications networks. For example, a user may establish communication with a server using a "smart phone" via a cellular carrier's network (e.g., authenticating herself to the server by voice recognition over a voice channel); alternatively, she may use the same smart phone to authenticate to the same server via the Internet, using TCP/IP over the carrier's switch network or via Wi-Fi and a computer network connected to the Internet. Moreover, as indicated in FIG. 1, the devices 112 may intercommunicate with each other (e.g., an IPHONE may communicate with an IWATCH using Bluetooth and WiFi), and one or more devices 112 may communicate with node 110 using a short-range wireless protocol such as WiFi, Bluetooth or NFC.

It should be understood that while the servers 115, 120 are shown as physically separate devices within the institutional space 100, this is for illustrative purposes only. Multiple servers may in fact reside on the same computer, and may be "virtualized." Moreover, even separate machines need not reside in the institution's on-site data center; many facilities, for example, contract with a third party for authentication services delivered "in the cloud," i.e., remotely over the Internet or the public telecommunications infrastructure in a manner that is indistinguishable, to users, from a wholly local implementation. Accordingly, references herein to "servers" have no topological or device-level connotation; any functionally satisfactory deployment scheme, whether on a single or multiple machines wherever located, are within the scope of the present invention.

In accordance with embodiments of the invention, a security policy requiring strong authentication may accept a weaker form with corroboration by means of co-located devices 112; that is, because the user has established an activity pattern associating her with two or more co-located devices detectable by node 110, authentication server 115, or one of the devices themselves, even a weaker form of authentication in combination with the detected presence of co-located devices may be sufficient evidence of user identity. The number of co-located devices required for alternative modes authentication may depend on the default mode of authentication for a particular resource 116, i.e., the more sensitive the information and, hence, the stronger the required level of authentication for access thereto, the more device co-location may be required for alternative authentication modes.

For example, an exemplary security policy may be summarized as follows:

| Resource | 2 co-located devices | 3 co-located devices | Biometric scanner | Password | Physical access control |
|---|---|---|---|---|---|
| 1 | x+ | x | X | x+ | a |
| 2 |  | x+ | X | x+ | a |
| 3 |  |  | X | x+ | a |
| 4 | x++ | x+ | X | x+ | a | where X specifies a default authentication mode, x denotes an acceptable alternative authentication mode, x+ and x++ indicate, respectively, an authentication mode that is acceptable in conjunction with one or two additional authentication modes, and a indicates an additional authentication mode insufficient in itself but combinable with another mode. Thus, acknowledgment by a perimeter entry monitor 105 (e.g., a proximity card reader) that the user is within the access-controlled physical space 100 may corroborate another, more reliable mode of authentication. In accordance with the above policy, the default authentication mode for all resources is biometric; perhaps due to negative institutional experience with password leakage, the policy requires an additional point of corroboration (two or three co-located devices, a biometric scan or confirmed physical presence) along with a password. In particular, for Resource 1, detection of three co-located devices 112 known to be associated with the user, or two co-located devices 112 in combination with another authentication mode—i.e., physical access control, since the other authentication modes are sufficient in themselves—will suffice instead of biometric authentication. In effect, the latter combination corresponds to determining that the user possesses two devices as well as an access card, equivalent for purposes of this policy to possession of three detectable devices. Acceptable alternatives for Resource 2 are (i) detection of three co-located devices known to be associated with the user or (ii) entry of a password, either (i) or (ii) in combination with another form of authentication (e.g., if three co-located devices are detected, the additional corroboration may be entering a password or having been registered as present in the facility by a perimeter entry monitor 105). Resource 4, the most sensitive in the group, always requires at least two alternative modalities if biometric authentication is not possible.

These basic alternatives can be parsed more finely or defined in a more granular fashion. For example, the last time the user was authenticated on one or more devices may also be important: the longer the elapsed time from the last-known user authentication to one of the devices, the less meaningful the presence of that device is to corroboration; hence, if too much time has passed, the user may be required to re-authenticate in order to keep or promote to a higher level of confidence. For example, if a user presents a password/token and then seeks to resume access within some time window (i.e., a "grace period"), the token becomes the only requirement (e.g., tap the card on the reader).

Figure 2:
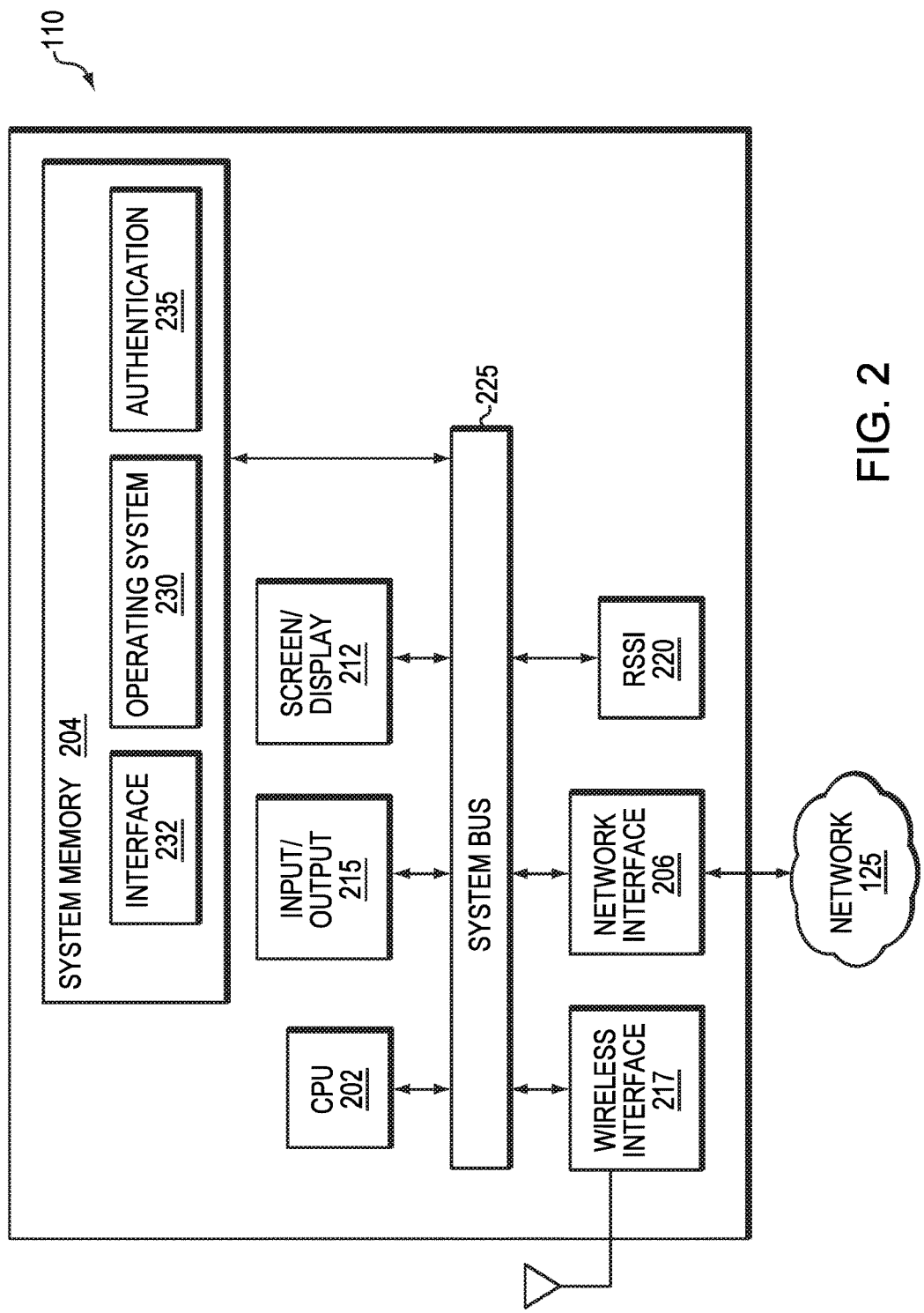
FIG. 2 schematically illustrates a node in accordance with embodiments of the invention.

Implementation of the above-described policy at a node 110 is best understood with reference, first, to FIG. 2, which illustrates a representative node. The node 110 may be a workstation (e.g., a general-purpose personal computer running suitable software), a thick or thin client device, a kiosk, a network-connected medical device, or any other device with which clinicians and other users interact, and which may be moved from time to time within an institutional setting. Node 110 typically includes a processor 202 (e.g., a CPU microprocessor) and associated system memory 204, a network interface 206 (for connection to the institutional network 120 and/or the Internet), and, usually, one or more non-volatile digital storage elements (such as a hard disk, CD, DVD, USB memory key, etc.) and associated drives. Further, node 110 includes user input/output devices such as a display screen 212 and conventional tactile input devices 215 such as keyboard and mouse or touch pad. A wireless interface 217, which may be separate from or implemented within network interface 206, facilitates wireless communication (including with user mobile devices) over long- and/or short-range wireless protocols. In some embodiments, workstation 110 includes a received signal-strength indication (RSSI) circuit 220, which, again, may be implemented within or separate from wireless interface 217. The various components communicate with each other via one or more buses 225.

In use, processor 202 executes one or more computer programs (conceptually illustrated as program modules) stored in system memory 204. An operating system 230 (such as, e.g., MICROSOFT WINDOWS, UNIX, LINUX, iOS, or ANDROID) provides low-level system functions, such as file management, resource allocation, and routing of messages from and to hardware devices (such as I/O device(s) 215) and one or more higher-level user applications (such as EMR applications, office programs, a web browser, etc.) An interface 232 generates screen displays and receives user input via the input devices, e.g., by the user's typing on the keyboard, moving the mouse, or clicking with the mouse on a displayed control element. In some implementations, node 110 includes an authentication agent 235 that allows a user to obtain access to restricted data consistent with his privilege level and the security policies of the institution. Authentication agents are known in the art and described, for example, in U.S. Ser. No. 11/294,354, filed Dec. 5, 2005, the entire disclosure of which is hereby incorporated by reference, and may communicate with a remote authentication server that securely stores user credentials.

With reference to FIGS. 1 and 2, "co-location" may involve, most simply, detection by wireless interface 217 of a signal emitted by a user device 112 or the response of a device 112 to a signal transmitted by wireless interface 217. If signals from multiple devices 112 are detected, the signals may be analyzed to confirm that the devices are carried by the same individual. For example, RSSI 220 can determine the strengths of signals (e.g., Bluetooth signals) in the immediate environment, and authentication agent 235 may determine whether the amplitudes are sufficient and sufficiently similar to indicate both proximity and co-location. In other embodiments, a reader may interrogate the devices for on-board records of recent movements recorded by each device (using accelerometers, GPS signals, etc.), and analyzed to verify that they have followed identical recent paths. Smart phones and fitness trackers, for example, may store this information. Thus, data from an accelerometer can confirm that two or more devices are being carried by a single person by the timing of the person's steps. Each step causes a spike in the accelerometer readings of each device, regardless of their individual orientations. This approach may be more reliable than simply tracking 3D movement because people carry devices in many different ways. For example, someone may be wearing a smart watch and have a smart phone in her pocket. The movement patterns of the devices are not very similar as one is on the person's arm, which can be swinging as she walks or gesticulates, but using the timing of the spikes in the accelerometer readings caused by a user taking steps should be consistent regardless of the location or relative movement of the device. Accelerometer readings from different devices can also be used to corroborate that there is a common velocity vector over time that is based on the devices traveling in the same direction. This can be done by integrating the three-axis accelerations over time to compute the velocity vector and then correlate the readings from different devices.

The foregoing scenarios presume detection of the devices by a reader or other device at node 110. Alternatively, however, the devices 112 can form an ad hoc network, a piconet, or other similar device network via intercommunication (e.g., via Bluetooth, NFC, or other wireless communication protocol), and information can be shared among devices over the network. Moreover, the user may seek access to a secure resource 116 via one of the devices 112 rather than an institutional node 110. For example, the devices 112 may, pursuant to a network protocol, elect a "master" device that assesses signal strength from the other devices and/or queries the other devices for recent movement, and then, based on the gathered information, makes a determination whether it and the other intercommunicating devices are co-located (i.e., carried by the same person). Alternatively, the user may manually designate one of the devices 112 as the master device and then use this device to communicate affirmation of device co-location to an authentication server. For example, a device 112 may run an onboard authentication-support application ("app"). When the user launches the authentication-support app, he is presented with a menu of secure resources 116 that he is entitled to access. Menu selection of a particular secure resource results in communication, via network 125 (e.g., the telecommunications infrastructure or the Internet), between the app and the authentication server 115 responsible for controlling access to the selected resource. The app requests the current authentication policy for the selected resource as well as co-location data from database 117. Upon receipt thereof by the device 112 from authentication server 115, the app determines whether, in accordance with the security policy and the user's database record, device co-location can authenticate the user or corroborate authentication in a manner that increases user convenience. If so, the app either performs the authentication (if no user action is necessary) or causes the device 112 to display the options. For example, if the user's database record does not list three devices known to be owned by the user, authentication options involving three-device co-location will not be presented as options.

At this point, the allocation of processing responsibility between the app and authentication server 115 (since node 110 is assumed, in this scenario, not to participate) determines where the necessary authentication tasks are performed. Suppose that system design accords primary responsibility for authentication to the app. In accordance with the exemplary policy described above, the app causes the smart phone 112 to search for co-located devices, e.g., by detecting signals therefrom and/or transmitting a beacon signal that will "wake up" a device and cause it to identify itself. The app then determines, based on the received signal strength, whether the devices appear to be co-located. The database record supplied by authentication server 115 identifies other devices known to belong to the user. Depending on the details of the security policy, the app may go beyond determining whether other qualifying devices are merely proximate and cause the smart phone to query the other detected devices for movement-related information, basing the co-location determination on this information as well. The ability to confirm consistent movement as well as co-location may justify placing more trust in the device-based authentication.

If, for example, two other devices are detected and verified as being co-located with the smart phone, and if this alone or in conjunction with another authentication modality satisfies the security policy, the app causes the smart phone 112 to transmit confirmation of the detection to authentication server 115. For audit purposes, the app may also cause transmission of the identity of the other devices and the parameters upon which the determination of co-location was based.

If, on the other hand, the app detects only a single other device, identity corroboration via device co-location may not be possible, so the app checks whether another mode of authentication is possible without user action. For example, the app may cause the smart phone 112 to communicate with and query the facility's perimeter entry monitoring system to determine whether the user's physical presence has been registered. If so, and if this in combination with the detected device satisfies the security policy, the authentication server is so notified without involvement on the part of the user. If not, or if communication with an access-control system is not possible, the app may present the user with a password dialog screen or launch a fingerprint-reader app that reads the user's fingerprint from the touch screen of the smart phone. Once again, satisfaction of the downloaded security policy is registered by the authentication-support app and communicated to authentication server 115.

In some embodiments, primary processing responsibility for authentication may be accorded to authentication server 115, in which case the device-side app may gather device proximity parameters without analysis and simply cause these to be transmitted (e.g., with a request for access to a secure resource 116) to authentication server 115, which makes the co-location determination, retrieves the user's record from database 117, and evaluates authentication options for the user consistent with the institution's security policy. Upon receipt of the raw signal data, authentication server 115 determines from the retrieved record whether detected devices are registered as belonging to the user, and if so, analyzes the data to determine whether the devices are co-located. If they are, authentication server 115 determines whether the detection of co-located devices is sufficient to satisfy a security policy for the requested resource 116 or can contribute to satisfying a policy option. If not, authentication server 115 determines what additional authentication steps are required and proceeds as outlined above, preferably identifying the additional authentication criteria whose fulfillment will be least burdensome to the user.

Populating user database 117 and associating authenticated users with specific devices generally proceeds via an enrollment process. Enrollment typically begins with an initial authentication event that properly identifies the user and then allows authentication server 115 to add one or more devices to that user's entry in database 117. For example, the user may be challenged to enter valid authentication credentials (e.g., biometrics, PINS, etc.) via a keyboard, fingerprint reader or other peripheral. The credentials are received by or passed to authentication server 115, and upon successful authentication (i.e., a password, PIN, biometric or other credential match), authentication server 115 creates a profile record for the user in user database 117, and the user's credentials are associated with the record (e.g., via a pointer). Devices may be added to the user database record in a manual, automatic and/or ad hoc process.

In manual enrollment, the user directly registers device IDs with authentication server 115, which adds the information to the user's record in database 117. The enrollment process may create a signature for the device to prevent spoofing, and store the signature (or a link thereto) in user database 117 for comparison upon log-in. For example, a digital signature for a device can be generated using unique properties of the device (e.g., one or more serial numbers of components in the device or the phone number), or by embedding of cryptographic tokens (e.g., a certificate) to prove the machine identity at a subsequent time—that is, when detection of a device is used to authenticate someone, the identity of the device may be confirmed by authentication server 115 using the device-specific data.

In automatic enrollment, when the user successfully logs into a secure resource via a node 110, authentication agent 235 activates a reader (e.g., wireless interface 217) to scan for proximate wireless devices—i.e., devices close enough to the node to ensure association with the user—either as part of the log-in process or subsequently. Identifiers and/or descriptions of detected devices may be sent to authentication server 115, which adds as-yet-unregistered device identifiers to the user's profile record in database 117. For example, authentication agent 235 may ask the user whether she wishes to add a detected but unregistered device before obtaining registration information from the device.

In ad hoc enrollment, the user's database profile record is automatically updated when the user logs in. Moreover, database entries may be updated to de-list devices no longer in use or not routinely co-located with other devices. For example, upon log-in, agent 235 may check to verify that all of the expected devices are with the user. If any device is missing, action can be taken—for example, each device entry can have a "time to live" (ttl) field that is decremented each time a device is not detected during log-in, and when ttl=0, the device is removed from the user's database entry.

Any suitable programming language may be used to implement without undue experimentation the functions described above, with processing responsibility allocated between the wireless device and an authentication server as desired by the system designer. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Authentication server 115 may be implemented on any suitable computing device including a processing unit, a system memory, and a system bus that couples various system components including the system memory to the processing unit. During operation, the system memory contains the instructions implementing the authentication functionality. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A system for authenticating a user of a client device seeking access to a secure resource, the system comprising:
   a. an authentication server comprising:
      (i) an identity database including entries relating users with wireless devices belonging to the users;
      (ii) a memory for storing a security policy governing access to the secure resource; and
      (iii) circuitry for communicating with client devices and with the secure resource, and
   b. a client device comprising:
      (i) a processor;
      (ii) communication circuitry; and
      (iii) a memory containing stored instructions for causing the processor to (A) detect the presence of proximately located devices using the communication circuitry and (B) to communicate with the server,
   wherein the server and the client device cooperate to determine whether one or more other wireless devices detected by the client communication circuitry are (a) co-located with the client device and (b) listed and related to the user in the identity database, and, if so, whether the device co-location alone satisfies the security policy, wherein neither the server nor the client device receives user-specific authentication information from any of the detected wireless devices, and when the device co-location alone satisfies the security policy, according user access to the secure resource via the client device.

2. The system of claim 1, wherein the client device is configured to detect other devices and intercommunicate therewith over a device network.

3. The system of claim 2, wherein the client device is configured to obtain proximity data from the other devices, the co-location determination being based at least in part on the proximity data.

4. The system of claim 3, wherein the proximity data includes detected signal strengths from the other devices.

5. The system of claim 3, wherein the proximity data includes data tracking device movement.

6. The system of claim 1, wherein, when the security policy is not satisfied by the device co-location alone, the server and client device cooperate to (a) identify at least one additional authentication step whose fulfillment would satisfy the security policy, (b) cause fulfillment of the at least one additional authentication step, and (c) accord user access to the secure resource after fulfillment of the at least one additional authentication step.

7. The system of claim 6, wherein the server and client are configured to search initially for additional authentication steps whose fulfillment would satisfy the security policy and that do not require user action.

8. The system of claim 7, wherein when there are no additional authentication steps that do not require user action but would satisfy the security policy, the client is configured to engage the user to fulfill the at least one additional authentication step.

9. The system of claim 1, wherein the authentication server and the client device are configured to cooperatively update a user's entry in the identity database by (i) at the client device, scanning for proximate wireless devices and transmitting registration information therefor to the authentication server, and (ii) at the authentication server, updating the user's entry in the identity database by adding registration information for devices not already listed in the user's entry.

10. The system of claim 9, wherein the authentication server is further configured to remove a device entry from a user's database record when the device has not been detected during more than a threshold number of log-in events at the client device.

11. The system of claim 1, wherein the client device is a wireless device.

12. The system of claim 1, wherein the server and the client device cooperate to determine whether two or more other wireless devices are (a) co-located with the client device and (b) listed and related to the user in the identity database, and, if so, whether the device co-location alone satisfies the security policy, wherein neither the server nor the client device receives user-specific authentication information from any of the detected wireless devices, and when the device co-location alone satisfies the security policy, according user access to the secure resource via the client device.

13. The system of claim 1, wherein the client device lacks any modality for biometric authentication.

14. A method for authenticating a user of a client device seeking access to a secure resource, the method comprising the steps of, at a client wireless device:
   downloading a security policy;
   electronically detecting one or more other wireless devices co-located with the client wireless device;
   determining whether the one or more other wireless devices are listed and related to the user in an identity database that includes entries relating users with wireless devices belonging to the users;

when the one or more other wireless devices are listed and related to the user in the identity database, determining whether detection of the one or more other wireless devices co-located with the client wireless device is alone sufficient to satisfy the downloaded security policy, wherein the client wireless device does not receive user-specific authentication information from any of the one or more other wireless devices; and when detection of the one or more other wireless devices co-located with the client wireless device alone is sufficient to satisfy the downloaded security policy, according the user access to the secure resource.

15. The method of claim 14, wherein the client wireless device communicates with the one or more other wireless devices over a device network.

16. The method of claim 14, further comprising the step of obtaining, by the client wireless device, proximity data from the one or more other wireless devices, the co-location determination being based at least in part on the proximity data.

17. The method of claim 16, wherein the proximity data includes detected signal strengths from the one or more other wireless devices.

18. The method of claim 16, wherein the proximity data includes data tracking device movement.

19. The method of claim 14, further comprising, when the detection of the one or more other wireless devices co-located with the client wireless device is not sufficient to satisfy the security policy alone, identifying at least one additional authentication step whose fulfillment would satisfy the security policy, causing fulfillment of the at least one additional authentication step, and according the user access to the secure resource after fulfillment of the at least one additional authentication step.

20. The method of claim 19, further comprising the step of searching initially for additional authentication steps whose fulfillment would satisfy the security policy and that do not require user action.

21. The method of claim 20, wherein, when there are no additional authentication steps that do not require user action but would satisfy the security policy, causing fulfillment of the at least one additional authentication step comprises engaging the user to fulfill the at least one additional authentication step.

22. The method of claim 19, wherein the identification of at least one additional authentication step whose fulfillment would satisfy the security policy is performed cooperatively with an authentication server.

23. The method of claim 14, wherein the client wireless device and the one or more other wireless devices form an ad hoc network.

24. The method of claim 14, wherein:
two or more other wireless devices co-located with the client wireless device are electronically detected; and
wherein determining whether detection of the one or more other wireless devices co-located with the client wireless device alone is sufficient to satisfy the downloaded security policy comprises determining whether detection of the two or more other wireless devices co-located with the client device is sufficient to satisfy the downloaded security policy.

25. The method of claim 14, wherein the client wireless device lacks any modality for biometric authentication.

26. A method for authenticating a user of a client device seeking access to a secure resource, the method comprising the steps of, at a server:
electronically accessing a security policy;
receiving data from the client device indicative of detection of one or more other wireless devices;
determining, based on the data, whether the one or more detected devices are co-located with the client device;
determining, based on the data, whether the one or more detected devices are listed and related to the user in an identity database that includes entries relating users with wireless devices belonging to the users;
when the one or more detected devices are listed and related to the user in the identity database, determining whether co-location of the one or more other devices with the client device is alone sufficient to satisfy the accessed security policy, wherein the client device does not receive user-specific authentication information from any of the one or more detected devices; and
when the co-location of the one or more other devices with the client device is alone sufficient to satisfy the accessed security policy, according the user access to the secure resource via the client device.

27. The method of claim 26, further comprising, when the co-location of the one or more other devices with the client device is not sufficient to satisfy the security policy alone, identifying at least one additional authentication step whose fulfillment would satisfy the security policy, causing fulfillment of the at least one additional authentication step, and according the user access to the secure resource after fulfillment of the at least one additional authentication step.

28. The method of claim 27, wherein causing fulfillment of the at least one additional authentication step is performed cooperatively with the client device.

29. The method of claim 27, further comprising the step of searching initially for additional authentication steps whose fulfillment would satisfy the security policy and that do not require user action.

30. The method of claim 29, wherein, when there are no additional authentication steps that do not require user action but would satisfy the security policy, causing fulfillment of the at least one additional authentication step comprises engaging the user to fulfill the at least one additional authentication step.

31. The method of claim 26, wherein:
data indicative of detection of two or more other wireless devices is received from the client device; and
determining whether co-location of the other devices with the client device alone is sufficient to satisfy the downloaded security policy comprises determining whether co-location of the two or more other devices with the client device is sufficient to satisfy the downloaded security policy.

32. The method of claim 26, wherein the client device is a wireless device.

33. The method of claim 26, wherein the server does not receive user-specific authentication information from any of the one or more detected devices.

34. The method of claim 26, wherein the client device lacks any modality for biometric authentication.

* * * * *